United States Patent
Burton (10) Patent No.: US 10,137,635 B2
(45) Date of Patent: Nov. 27, 2018

(54) SYSTEM AND METHOD FOR PRINTING PATH PLANNING FOR MANUFACTURING OF FUNCTIONALLY GRADED MATERIALS WITH THE AID OF A DIGITAL COMPUTER

(71) Applicant: Palo Alto Research Center Incorporated, Palo Alto, CA (US)

(72) Inventor: Gregory Lewis Burton, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 223 days.

(21) Appl. No.: 15/159,088

(22) Filed: May 19, 2016

(65) Prior Publication Data

US 2017/0334141 A1    Nov. 23, 2017

(51) Int. Cl.
| | |
|---|---|
| B29C 64/386 | (2017.01) |
| G05B 19/4099 | (2006.01) |
| B33Y 70/00 | (2015.01) |
| B33Y 10/00 | (2015.01) |
| B33Y 30/00 | (2015.01) |
| B29C 64/106 | (2017.01) |
| B33Y 50/02 | (2015.01) |

(52) U.S. Cl.
CPC .......... *B29C 64/386* (2017.08); *B29C 64/106* (2017.08); *B33Y 10/00* (2014.12); *B33Y 30/00* (2014.12); *B33Y 70/00* (2014.12); *G05B 19/4099* (2013.01); *B33Y 50/02* (2014.12); *G05B 2219/49026* (2013.01)

(58) Field of Classification Search
CPC .............. B29C 64/386; G05B 19/4099; G05B 2219/49026; B33Y 50/02
USPC .......................................................... 700/119
See application file for complete search history.

(56) References Cited

U.S. PATENT DOCUMENTS

| | | | |
|---|---|---|---|
| 2008/0182017 A1* | 7/2008 | Singh .................... | B22F 3/1055 427/142 |
| 2015/0242564 A1* | 8/2015 | Chang ................ | G05B 19/4099 700/118 |

(Continued)

OTHER PUBLICATIONS

T. Oksanen and A. Visala, "Path Planning Algorithms for Agricultural Machines". Agricultural Engineering International: the CIGR Ejournal. Manuscript ATOE 07 009. vol. IX. Jul. 2007.

(Continued)

*Primary Examiner* — Kenneth M Lo
*Assistant Examiner* — Michael W Choi
(74) *Attorney, Agent, or Firm* — Patrick J. S. Inouye; Leonid Kisselev (57) ABSTRACT

Functionally graded materials can be prepared through additive manufacturing by determining the path that a head of 3D printer can follow while extruding a material mix of a required composition at required points of a layer of an FGM. Each point within the layer is evaluated regarding the directions within which the printing head can move into from that point while extruding the material mix of a required composition. Based on the evaluation, a multitude of polygons are defined within the polygonal shape that are guaranteed to be printable. A path can be designed for the printing head to follow to print all of the defined polygons, and consequently, to print the entire polygonal layer. Material extrusion commands are generated for the printing head.

19 Claims, 10 Drawing Sheets

(56) References Cited

U.S. PATENT DOCUMENTS

2016/0075089 A1* 3/2016 Duro Royo ......... B29C 67/0088
264/308
2017/0297221 A1* 10/2017 Leu ........................ B28B 1/001

OTHER PUBLICATIONS

Slic3r—About, URL <http://slic3r.org/about/>, (Web page cached on Mar. 8, 2016).

* cited by examiner

SYSTEM AND METHOD FOR PRINTING PATH PLANNING FOR MANUFACTURING OF FUNCTIONALLY GRADED MATERIALS WITH THE AID OF A DIGITAL COMPUTER

FIELD

This application relates in general to computer-aided additive manufacturing planning and, in particular, to a system and method for printing path planning for manufacturing of functionally graded materials with the aid of a digital computer.

BACKGROUND

Additive manufacturing, also known as 3D printing allows to create three-dimensional objects by depositing desired material or materials in successive layers. Prior to printing, the materials are stored in one or more reservoirs of a 3D printer and are extruded through one or more heads of the printer that move to extrude the desired materials at different points in the layer while moving in predefined paths. While the extrusion is relatively straightforward when the materials stored the reservoirs are extruded from one of the heads in isolation, the extrusion becomes more complicated when a functionally graded material ("FGM") has to be created using 3D printing. An FGM is composite of two or more input materials whose concentrations vary in different portions of the FGM, with the portions possessing properties that are hybrids of the properties of the input materials, with the properties depending on the relative amounts of the input materials within the respective portions. Examples of functionally graded materials in nature include organic structures, such as muscle tissue smoothly transitioning into tendon to allow for a strong bond with strain-relief when connecting to a rigid bone. Similarly, in 3D printing, the ability to manufacture an FGM allows to create highly optimized part designs meant to meet bulk performance requirements, such as weight, elasticity in particular directions, and rigidity in other directions.

Creation of an FGM requires mixing two or more of the input materials in desired proportions within a 3D printer and then extruding the mix in points of the FGM where the proportions are necessary. Such mixing is performed in a chamber within the printer into which the input materials are supplied from the storage reservoirs and from which the mix is extruded through the printing head. The composition in the mix within the mixing chamber can change only at a certain rate, which is governed by the both characteristics of the printer and an initial composition of the mix, and the printer head is limited by this rate of change in being able to extrude the mix of a certain composition. Thus, if a predefined path of the extruding head requires the head to extrude the mix of compositions not compatible with the rate of change, the printer head would not be able to comply with the extrusion command and an FGM could not be printed properly without purging the contents of the mixing chamber. Such a purging would not only significantly slow down the printing process, but would also waste materials that is already loaded into the mixing chamber.

Existing techniques for planning the path of a printing head during a 3D printing do not adequately account for the ability of the printer head to extrude a required material mix at a particular point in the path. Such techniques assume that material or materials having desired properties have already been loaded into the printer's storage reservoirs. Furthermore, such techniques generally assume that that only one, or at most two, materials need to be extruded and do not consider the possibility of mixes with different compositions being extruded during printing.

Accordingly, there is a need for a way to plan a path for a 3D printer's extruding head during 3D printing that accounts for the rate at which compositions of a mix extruded from the printing head can change and is suitable for printing functionally graded materials.

SUMMARY

Functionally graded materials can be prepared through additive manufacturing by determining the path that a head of 3D printer can follow while extruding a material mix of a required composition at required points of a layer of an FMG. Each point within the layer is evaluated regarding the directions within which the printing head can move into from that point while extruding the material mix of a required composition. Based on the evaluation, a multitude of polygons are defined within the polygonal shape that are guaranteed to be printable. A path can be designed for the printing head to follow to print all of the defined polygons, and consequently, to print the entire polygonal layer. Material extrusion commands are generated for the printing head. As the path is based on polygons that are guaranteed to be printable without purging the mixing chamber of the 3D printer, following the path allows the printing head to print the FGM.

In one embodiment, a system and method for printing path planning for functionally graded material with the aid of a digital computer are provided. One or more characteristics of a 3D printer are retrieved, the printer including two or more reservoirs, each of the reservoirs shaped to store a printing material, the printer further comprising a mixing chamber for mixing the materials supplied from the chambers upon receiving material extrusion commands, and at least one head for extruding the mixed materials. A representation is obtained of a layer of a functionally graded material object, the layer having a polygonal shape and including a plurality of points associated with a composition of the material mix, to be printed by the printer, the printing including extruding at every point the material mix of the composition associated with that point. For each of the points, rates of change in the material composition between the composition associated with that point and the composition associated with one or more other of the points located in one or more directions from that point. For each of the points is determined whether the printer head can move while printing the layer to one or more of the other points along one or more of the directions is determined based on the characteristics, the rates of the change between that point and the other points, and the material composition at that point and the other point. Boundaries of a plurality of polygons included within the polygonal shape that can be printed by the printer head moving in one or more of the directions based on the determinations are defined. A path is generated for the head to print all of the polygons based on the boundaries. Material extrusion commands for the printer head are generated based on the generated path.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
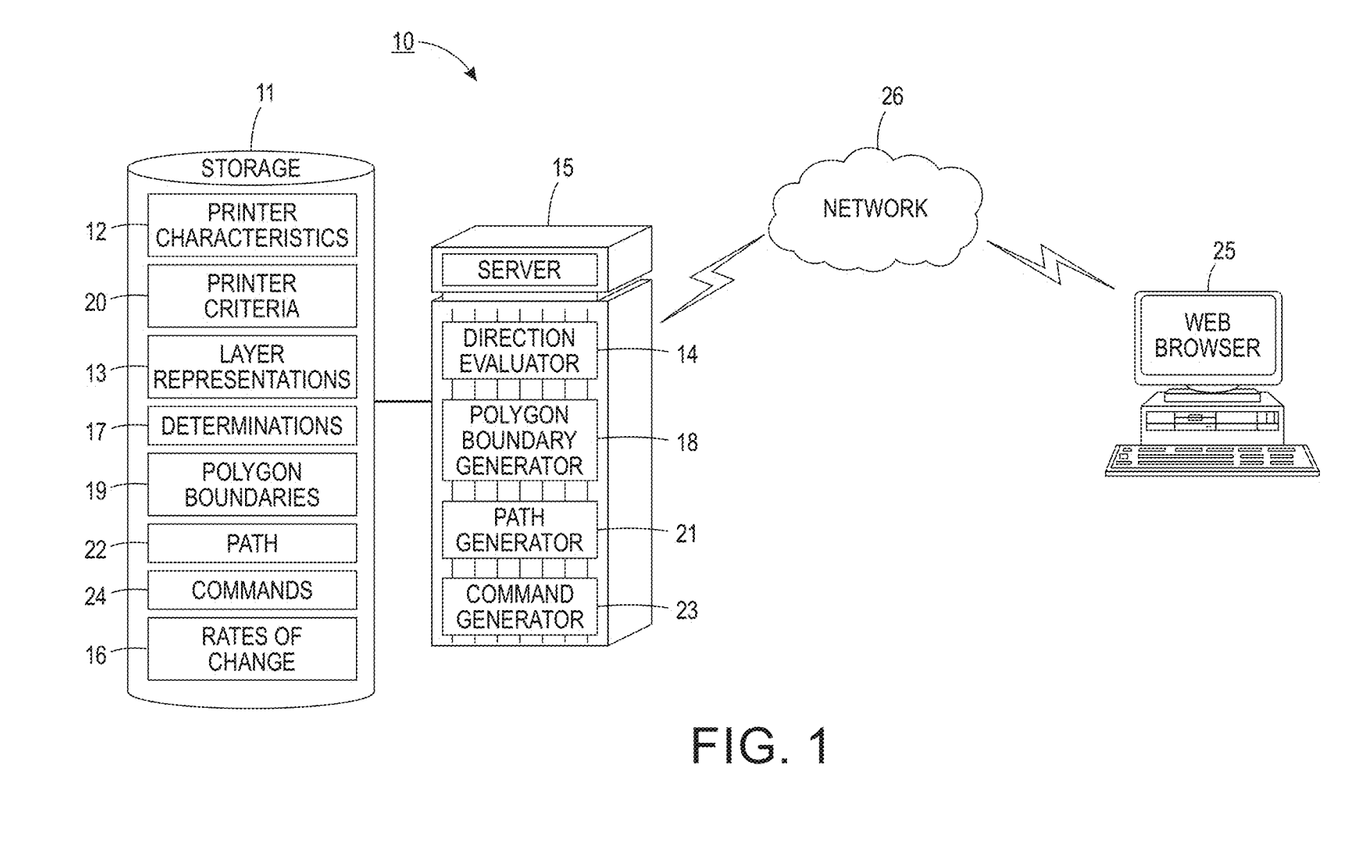
FIG. 1 is a block diagram showing a system for printing path planning for manufacturing of functionally graded materials with the aid of a digital computer in accordance with one embodiment.

FGMs can be reliably manufactured by planning the path of a printing head of 3D printer to account for whether a printing head can extrude a material mix of a required composition at a particular point in the path. While the description below references two input materials that go into the mix, more than two input materials can also be used. FIG. 1 is a block diagram showing a system 10 for printing path planning for manufacturing of functionally graded materials with the aid of a digital computer in accordance with one embodiment. The system 10 includes a storage 11 that stores characteristics of a 3D printer capable of mixing two or more input materials and extruding a composite mix. In a further embodiment, the printer is also able to extrude one of the input materials without mixing the material with other materials.

Such a printer includes at least two storage reservoirs for storing the input materials, a mixing chamber where the input are mixed, and at least one printer head from which the mix of the materials created in the mixing chamber is output. The characteristics 12 of the printer control the rate at which the composition of the mix extruding from the printing head can change, and can include the size of the mixing chamber, though other characteristics 12 are possible. For example, if a 3D printer includes a stirring propeller for mixing the materials, properties of the propeller could be included in the characteristics 12. Still other characteristics are possible. Further, such rate depends on the initial composition of the mix in the mixing chamber and the target composition of the mix. Still other characteristics are possible.

Figure 2:
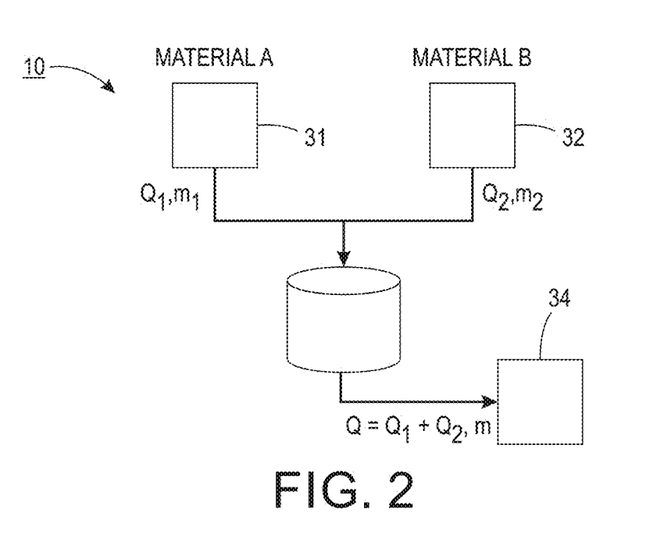
FIG. 2 is a diagram illustrating one example of the dependence of the rate of change of a composition of a material mix that can be extruded on the characteristics of the 3D printer.

FIG. 2 is a diagram 30 illustrating one example of the dependence of the rate of change of a composition of a material mix that can be extruded on the characteristics of the 3D printer. Two storage reservoirs 31, 32 hold two different input materials, designated as material A and material B. The reservoirs 31, 32 are connected to a mixing chamber 33, where the input materials can be mixed and from where an output material supplied into the printing head 34. As mentioned above, one factor on which the rate at which the composition of the mix can change within the mixing chamber 33 depends is the initial composition of the mix in the mixing chamber. For example, if the composition of the mix is 50% material A and 50% material B, and a transition to 99% material A in the mix is necessary (theoretically, in an ideal mixer, a transition to 100% material A is impossible if there is an amount of material B in the reservoir) and exclusively material A can be fed into the mixing chamber 33, the composition of the outlet material will transition from 50% material A to 99% material A in accordance with the equations shown below. However, if instead the mixing chamber 33 composition started at 90% material A and 10% material B, and a transition to 99% material A is necessary, the amount of time necessary to reach an outlet composition of 99% A would be nearly the same amount of time necessary to transition from 50% material A to 99% material A, even if only material A was fed into the mixing chamber in both cases, as explained by ideal mixing dynamics (with an ideal mixer being a mixer in which materials are instantly and homogenously mixed). Thus, how quickly the composition of the mix in the mixing chamber can transition to a goal composition, is a function of the reservoir composition, e.g. the closer the reservoir composition is to 100% material A, the longer the transition further towards 100% A will take, but conversely, the closer the mixing chamber 33 composition is to 100% material A, the more quickly the mix composition can transition towards 100% material B. The transition time is governed by the equations below:

$$\frac{dm}{dt} = \frac{Q_1}{V}[m_1 - m] + \frac{Q_2}{V}[m_2 - m]$$

$$m_{Steady\text{-}State} = \frac{Q_1 m_1 + Q_2 m_2}{Q_1 + Q_2}$$

$$\frac{dm}{d\tau} = f_1 - m$$

$$m = f_1 - (f_1 - m_0)e^{-\tau}$$

$$\tau = \log\frac{f_1 - m_0}{f_1 - m_{ss}}$$

In the formulas above, $Q_1$ and $Q_2$ represent volumetric flow (such as in milliliters per minute, though other flow rates are possible) rate from reservoirs 31 and 32 respectively, into the mixing chamber 33; $m_1$ is the mass fraction of material A in reservoir 31; $m_2$ is the mass fraction of material A in reservoir 32; $m_{steady-state}$ is the mass fraction of material A at the outlet of the mixing chamber 33 once materials that have flowed into the mixer are completely mixed (instantly for the ideal mixer); $f_1=Q_1/(Q_1+Q_2)$ is the fraction of the total flow rate from the reservoir 31 containing material A; $\tau$ is the time constant of the exponential decay function for m, the function describing the mass fraction of A in time; "ss" stands for steady state; $m_0$ is the mass fraction of material A at the outlet of the mixing chamber 33 at time zero.

Returning to FIG. 1, the storage 11 also stores one or more representations 13 of layers of a functionally graded material object that needs to be printed. Each layer has a polygonal shape and includes a set of polygons, with at least some of the polygon including space where no mixed material is added ("polygonal holes"). Each layer includes a plurality of points, each associated with particular spatial coordinates within the layer and the material composition that needs to be extruded in that layer. The representation 13 for each layer can include a two-dimensional array, with one dimension listing an identification of a point (such as spatial coordinates of the point) in a layer and the other dimension listing the composition of the materials that needs to be extruded in that point. In instances where coordinates correspond to a polygonal hole, no amount of material is listed as to be added in particular coordinates. For example, if there are only two input materials are mixed, the composition by can be represented by only a percentage of one of the input materials in the mix (with the composition of the other material being derivable from the composition of the first material). Other ways to represent the composition are possible. While in the description below, the extruded materials are referred to as a mix, in a further embodiment, the extruded materials for some of the points could be one of the input materials unmixed with other input materials. Other kinds of the representations 13 are possible. The representation can be obtained from an external source or can be generated by a direction evaluator 14 executed by one or more servers 15 operatively coupled to the storage 11, with the servers 15 planning the path of the printer head as further described below and with reference to FIG. 7. The direction evaluator 14 can compute the array based on an input such as a spatial function defining the material mix composition, as supported by the Additive Manufacturing File format. Other ways to obtain the representations 13 are possible.

Figure 3:
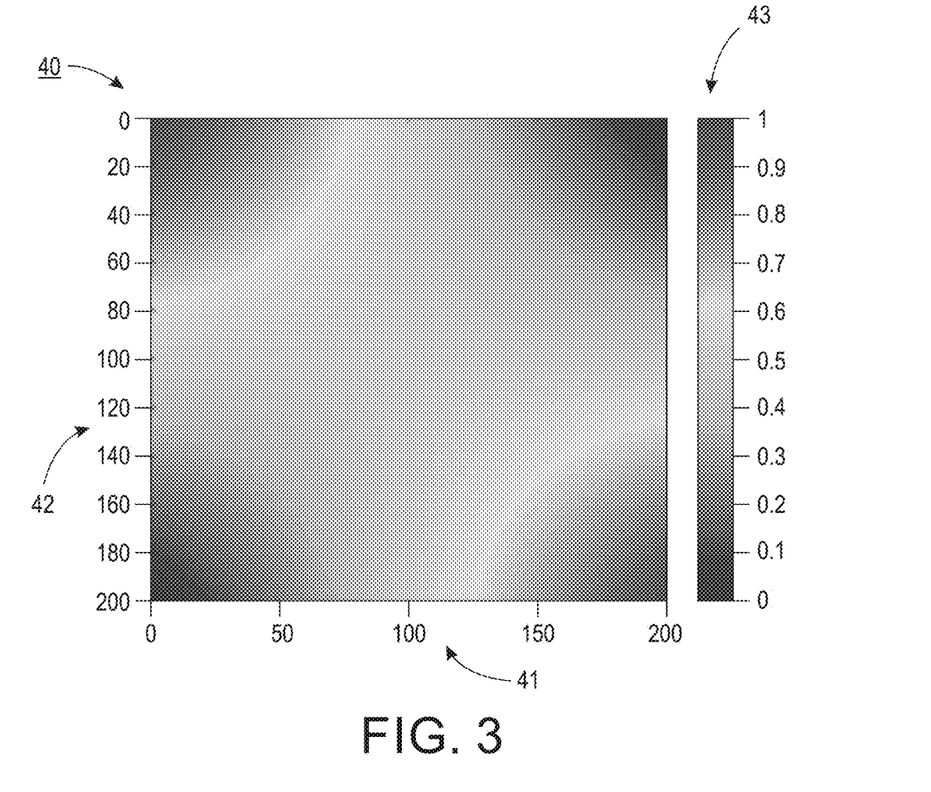
FIG. 3 is a diagram illustrating spatial coordinates and material composition associated with each point in a layer an object for 3D printing.
Figure 4A:
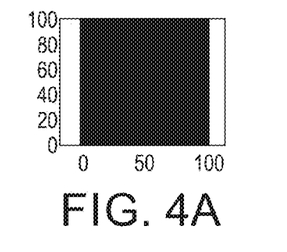
FIGS. 4A-4D show, by way of example, a plurality of polygons that can be generated to fill an area of a rectangular polygonal shape.
Figure 4B:
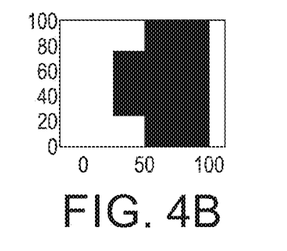
Figure 4C:
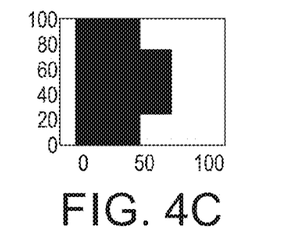
Figure 4D:
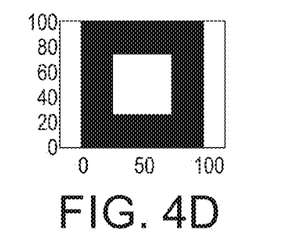

As mentioned above, each layer includes spatial points and the composition of the mix that needs to be extruded at that points adds an additional dimension to how each layer can be represented. FIG. 3 is a diagram 40 illustrating spatial coordinates and material composition associated with each point in a layer an object for 3D printing. As seen with reference to FIG. 3, points of the layer of an object that needs to be 3D-printed can be represented using spatial coordinates along the x-axis 41 and the y-axis 42 of the y-axis of a graph. Each of point is further associated with a material composition at that point, with the material composition at each point being illustrated using different colors (or a shades of a color) in FIG. 3, with the correspondence of the color to a composition being shown in the bar 43. The numbers in the bar 43 show a concentration of one input material in the extruded material (with the concentration ranging from 1 (100%) to 0 (0%) and being represented using different colors and shades of colors at different concentrations). The concentration of the other input material can be calculated from the concentration of the first input material. While in FIG. 3 each set of the coordinates is associated with a material composition, as described above, at least some of the coordinates may be associated with no material being extruded (polygonal holes).

Returning to FIG. 1, for every point in the layer, the direction evaluator 14 uses the representation to calculate rates of change 16 (also known as derivatives) in the composition of the material mix that needs to be extruded at that point ("an origin point") and at one more points adjacent to that origin point. The adjacent points are located in one or more directions from that point into which the printer head needs to move, such as left, right, up or down (relative to the spatial coordinates of a point along the y-axis, as shown with reference to FIG. 3A above), or diagonally, though other directions are possible.

Subsequently, for each of the points in the layer, the direction evaluator 14 determines whether the printing head can move from that point to any of the adjacent points in the desired directions. The determination is made based on the rate of change 16 in the mix composition that needs to be extruded for that point, and the characteristics 12 of the printer. If the rate of change 16 in material composition required to move between two points is greater than the rate of change 16 that the printer can achieve starting at the material composition at the origin point, the determination 17 is made that the printer head cannot move between the two points. If the rate of change 16 in material composition required to move between two points is smaller than or equal to the rate of change 16 that the printer can achieve starting at the material composition at the origin point, the determination 17 is made that the printer head can move between the two points. In a further embodiment, a predefined amount of tolerance between the required rate of change and the achievable rate of change can be allowed when making a determination that the printing head can move into the direction. The determinations 17 are stored in the storage 11. The determinations 17 can be stored as a 2-dimensional array, though other ways to store the determinations are possible.

The server 15 also executes a polygon boundary generator 18 that uses the determinations 17 to generate boundaries 19 of multiple polygons that together fill the polygonal shape of a layer for which the determinations 17 are made. Each of the polygons can be separately filled with the material mix of the required compositions at each of the points in that mix, thus allowing each of the polygons to be printed. FIGS. 4A-4D show, by way of example, a plurality of polygons that can be generated to fill an area of a rectangular polygonal shape. The boundaries of the polygons are shown in white, with the remaining area within the polygonal shape shown in black. The polygons boundaries 18 can be generated in a multitude of ways, as further described beginning with reference to FIG. 9. For example, polygons could first be covered into a direction that cover the largest area, as further described with reference to FIG. 10. Alternatively, polygons boundaries can be generated while trying optimize printing criteria 20 that can be stored, as further described with reference to FIG. 11. Such criteria can include a number of stops and starts of movements of the extruding head during the printing; a number of the directions in which the extruding head moves during the printing; a time required for the printing; and smallest of the rates of change of the material composition during the printing. Still other printing criteria 20 are possible.

The servers 15 further execute a path generator 21 that generates a path 22 for the printing head to follow during a printing of a layer based on the defined polygon boundaries with that layer. Such path includes patterns of motion of the printer head and sequence of the patterns. Such path can be generated using a commercially available software, such as Slic3r® software distributed under the GNU Affero General Public License, version 3, though other commercially available and custom software can also be used to generate the path.

Figure 5A:
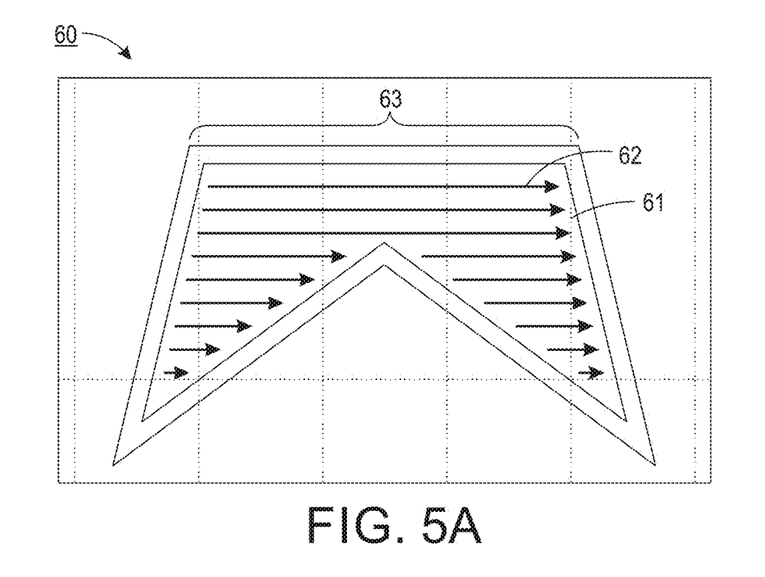
FIGS. 5A-5B are diagrams illustrating a zig-zag and a direction parallel patterns of motion.
Figure 5B:
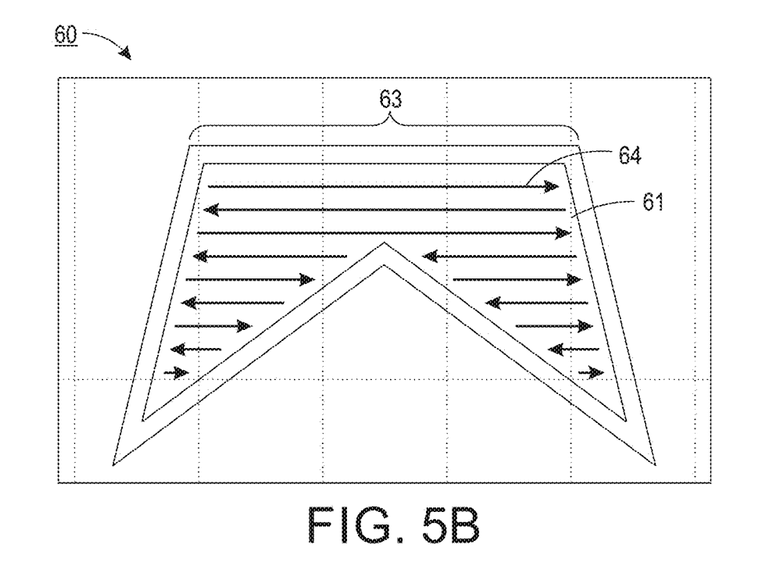
Figure 6:
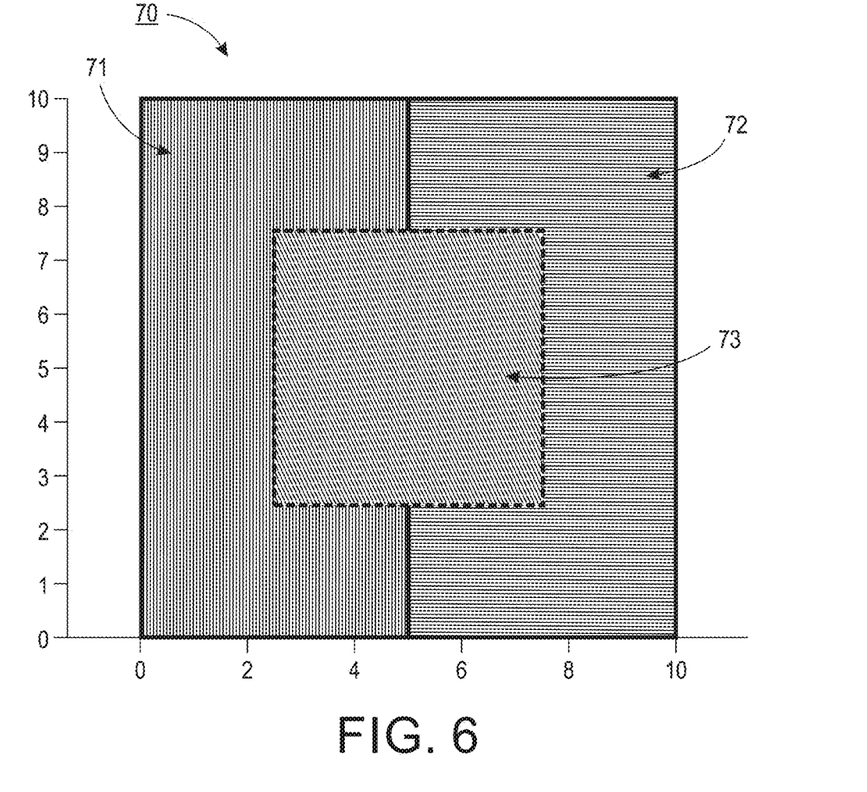
FIG. 6 is a diagram illustrating a path generated using only a direction-parallel pattern.

Multiple patterns can be included in the path. For example, a zig-zag and a direction-parallel pattern can be included in the path, though other patterns are also possible. FIGS. 5A-5B are diagrams illustrating a zig-zag and a direction parallel patterns of motion. FIG. 5A shows a layer of a polygonal shape 60 within which a plurality of points 61 are included and within which polygon boundaries 18 are defined. A printer head can print the defined boundaries by moving in directions shown by the arrows 62. In the direction parallel pattern, the printer head retracts between lines 63 of the printer head's path and the lines 63 are printed in the same direction of motion. In the zig-zag pattern of motion, illustrated by arrows 64 in FIG. 5B, the direction of movement of the printing head alternates between each line of the path. An example of a path generated using only a direction-parallel pattern is shown in diagram 70 shown in FIG. 6, with the polygons 71, 72, 73 being printed using the path. While only one pattern is present in the path 22 shown in FIG. 6, multiple patterns can be present in the same path 22. Other ways to generate the patterns are possible.

Once the path is generated, a command generator 22 executed by the servers 15 uses the path to generate commands 24 for the printing head to follow in printing the layer of the object. The commands 24 include the path that needs to be followed and the composition of the output material that needs to be extruded. The command generator 23 can break the path into a plurality of portions and then generate a command for each of the portions, though other ways to generate the commands.

The servers 15 are connected to a computing device 25, to which the generated commands 24 are output by the command generator 22. The servers 15 can be connected to the computing device 25 either directly or through a network 26, which can be either an Internetwork such as the Internet or a cellular network, or a local network. While the computing device 25 is shown a desktop computer, other types of computing devices, such as tablets, laptops, and smartphones are possible. The computing device can also be a 3D printer. Still other types of computing devices are possible. The transmitted commands can be used by the computing device 25 for printing an FGM, with the printer head being able to meet the required material composition that needs to be extruded, or be transmitted to another device for the printing.

The one or more servers 15 can each include one or more modules for carrying out the embodiments disclosed herein. The modules can be implemented as a computer program or procedure written as source code in a conventional programming language and is presented for execution by the central processing unit as object or byte code. Alternatively, the modules could also be implemented in hardware, either as integrated circuitry or burned into read-only memory components, and each of the servers can act as a specialized computer. For instance, when the modules are implemented as hardware, that particular hardware is specialized to perform the computations and communication described above and other computers cannot be used. Additionally, when the modules are burned into read-only memory components, the computer storing the read-only memory becomes specialized to perform the operations described above that other computers cannot. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components. For example, the servers 15 can include other components found in programmable computing devices, such as input/output ports, network interfaces, and non-volatile storage, although other components are possible. The servers 15 can also be cloud-based or be dedicated servers.

Figure 7:
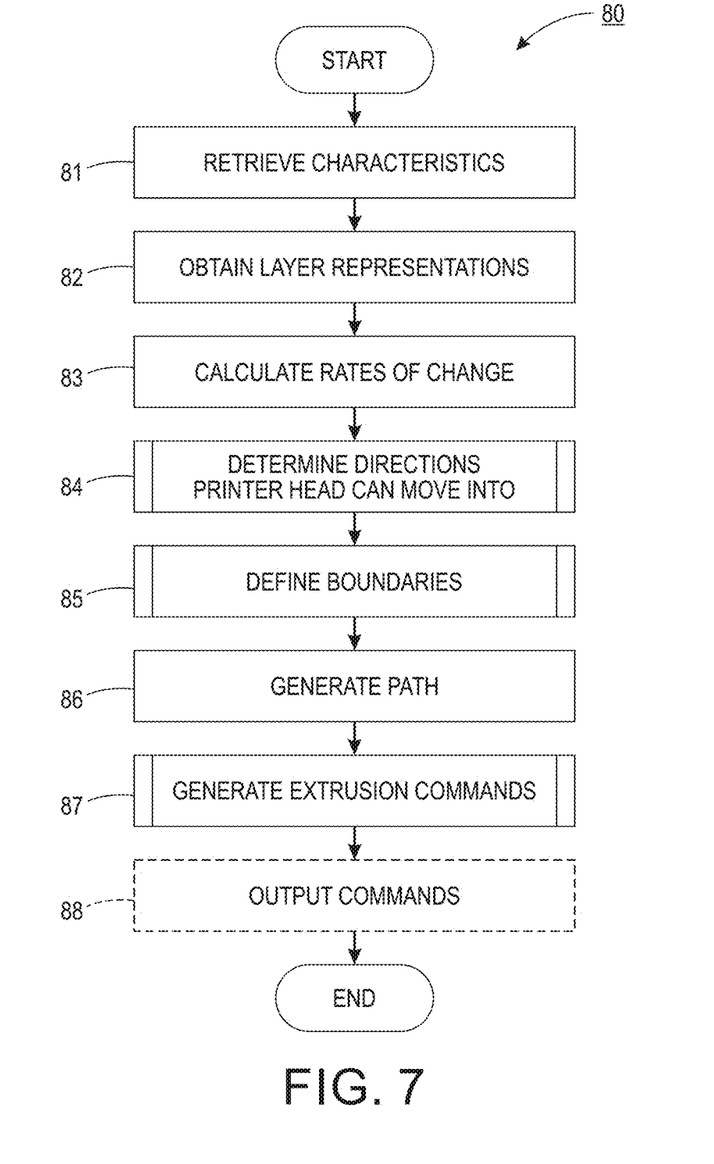
FIG. 7 is a flow diagram showing a method for a method for printing path planning for manufacturing of functionally graded materials with the aid of a digital computer in accordance with one embodiment.

Dividing a polygonal shape into a plurality of polygons that are guaranteed to be printable allows to define a path for printing the entire polygonal shape. FIG. 7 is a flow diagram showing a method for a method 80 for printing path planning for manufacturing of functionally graded materials with the aid of a digital computer in accordance with one embodiment. The method 80 can be implemented using the system 10 of FIG. 1. Characteristics 12 of a 3D printer which will be used for printing an FGM are obtained (step 81). At least one representation 13 of a layer of a polygonal shape of an FMG object that needs to be printed is obtained, such as by generating the representation based on a spatial function, as described above with reference to FIG. 1, or obtain through another source (step 82). A rate of change 16 in the composition of the material mix that needs to be extruded at two points in the layer is calculated between every point in the layer and at one more points adjacent to that point that is in the directed in which 3D printing needs to be performed (step 83).

Figure 8:
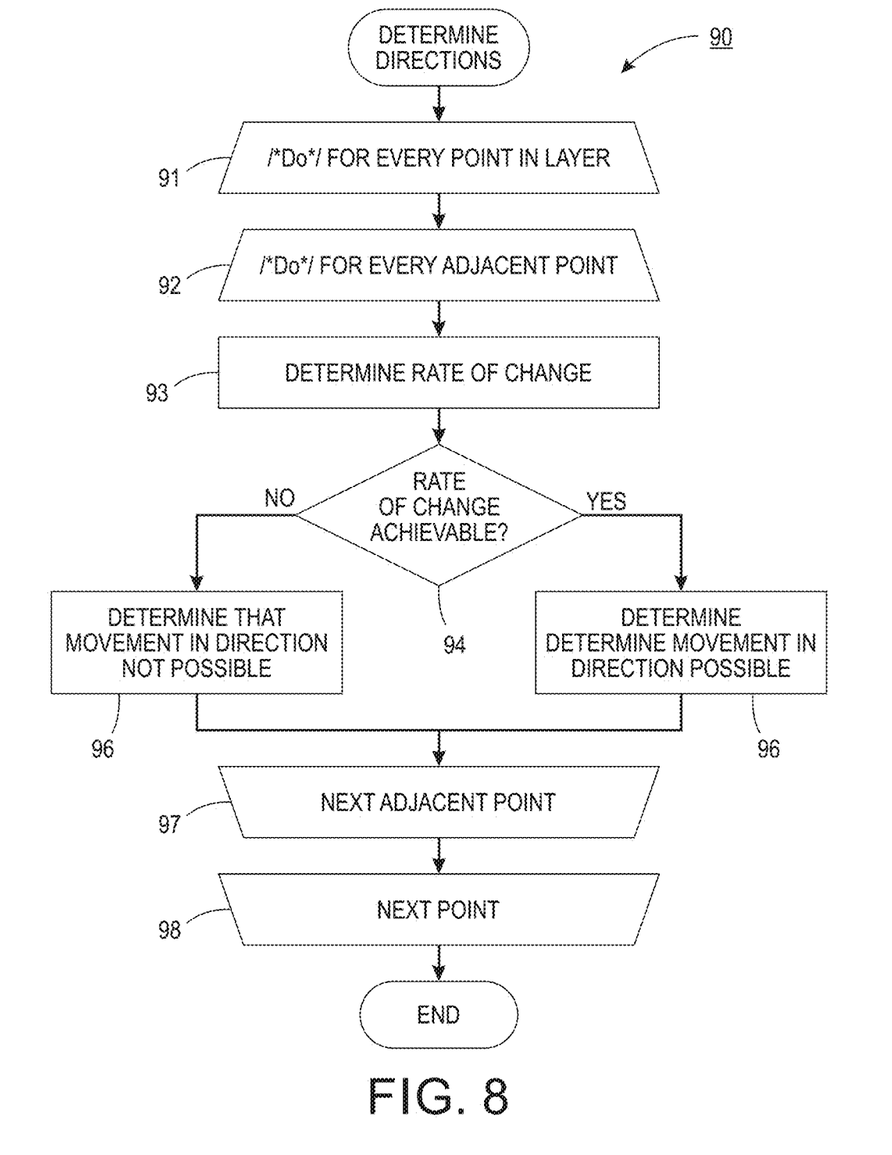
FIG. 8 is a flow diagram showing a routine for determining directions in which a printer head can move from a point in the layer for use in the method of FIG. 10 in accordance with one embodiment.

Directions into which the printer head can move while being able to extrude a required material composition from every point in the layer are determined (step 84), as further described with reference to FIG. 8. Boundaries of a plurality of polygons that together fill the area of the polygonal shape of the layer are defined, as further described below beginning with reference to FIG. 9 (step 85). A path 22 for the printer head to follow print all of the defined polygons, and consequently the entire polygonal shape of the layer, is generated, as further described above with reference to FIG. 1 (step 86). Commands are generated for a printing head of a 3D printer to follow to print the layer are based on the path, as further described below with reference to FIG. 12 (step 87). Optionally, the generated commands are output (step 88), ending the method 80.

Knowledge of where a printing head can move from a point in the layer while extruding a material mix of a requisite composition allows to define the path that a printing head can follow to successfully print an FGM. FIG. 8 is a flow diagram showing a routine 90 for determining directions in which a printer head can move from a point in the layer for use in the method 80 of FIG. 10 in accordance with one embodiment. An iterative processing loop (steps 91-98) is started for each point in the layer (step 91). An iterative processing loop (steps 92-98) is started for one or more points adjacent to the evaluated origin point (step 92). The rate of change 16 in the composition of the extruded material that needs to be achieved for the printing head to be move from the origin point to the adjacent point is determined (step 93). Whether the required rate of change is achievable without having to purge the mixing chamber of the material mix in the chamber is evaluated based on the material composition at the origin point, the adjacent point, and the characteristics 12 of the 3D printer, using the equations given above (step 94). In one embodiment, the rate is considered achievably only if that precise rate can be achieved. In a further embodiment, a rate of change considered achievable if the target rate of change is within a predefined tolerance of the achievable rate of change. If the rate of change cannot be achieved (step 94), a determination 17 is made that the printer head cannot move between the two points (step 95). If the rate of change can be achieved (step 94), a determination 17 is made that the printer head can move between the two points (step 96). The iterative processing loop (steps 92-97) moves to the next adjacent point (step 97). Once all of the adjacent points in which printing is necessary are evaluated, the iterative processing loop (steps 91-98) moves to the next point. Once all of the points have been evaluated using the steps 91-98, the routine 90 ends.

Figure 9:
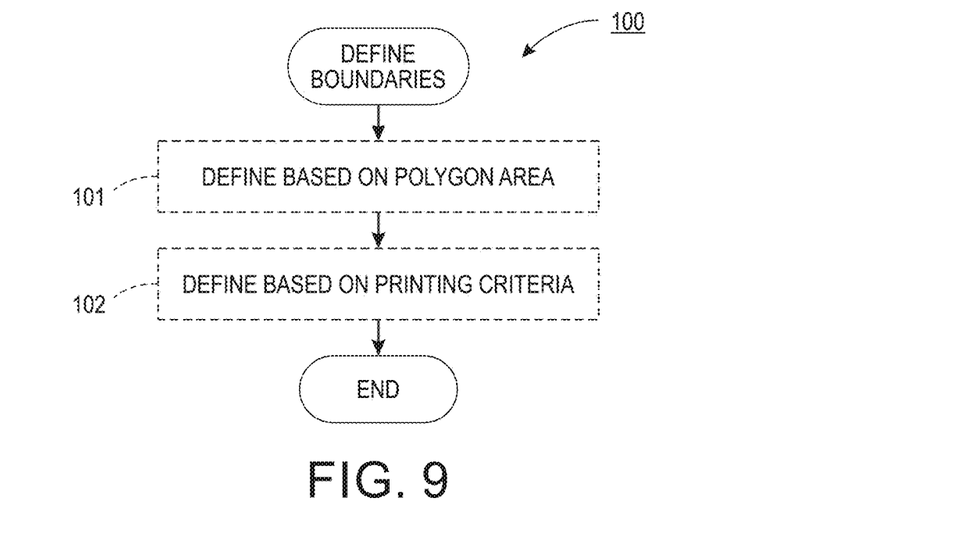
FIG. 9 is a flow diagram showing a routine for defining boundaries of polygonal shapes for use in the method of FIG. 7 in accordance with one embodiment.

Defining multiple polygons based on the determinations 17 allows to define a way to print out the area of the entire layer of the polygonal shape. FIG. 9 is a flow diagram showing a routine 100 for defining boundaries of polygonal shapes for use in the method 80 of FIG. 7 in accordance with one embodiment. A plurality of ways to define the boundaries exist. Optionally, a greedy strategy can be employed in which the polygons are created for the direction that covers the largest area are first created, as further described below with reference to FIG. 10 (step 101). Alternatively, also optionally, a search routine could be performed that attempts to optimize one or more of the printing criteria 20 and the boundaries are defined based on the optimization, as further described below with reference to FIG. 11 (step 102), ending the routine 100. Other ways to describe the polygon boundaries are possible.

Figure 10:
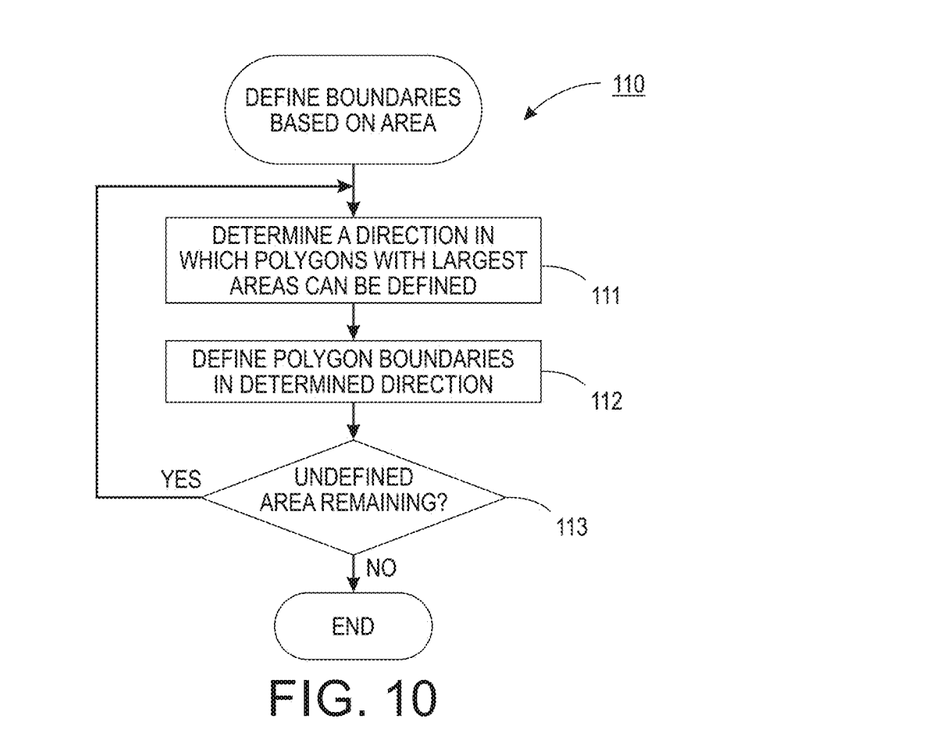
FIG. 10 is a flow diagram showing a routine for defining polygon boundaries based a direction that covers a largest area in accordance for use in the routine of FIG. 9 in accordance with one embodiment.

FIG. 10 is a flow diagram showing a routine 110 for defining polygon boundaries based a direction that covers a largest area for use in the routine 100 of FIG. 9 in accordance with one embodiment. A direction in which one or more polygons can be created that cover the largest possible area is determined (step 111). The polygon boundaries are defined in the determined direction (step 112). Whether any area of the polygonal shape of the layer remains unfilled is determined (step 113). If unfilled area remains (step 113), the routine 110 returns to step 111. If all of the area of the polygonal shape has been filled, the routine 110 ends.

Figure 11:
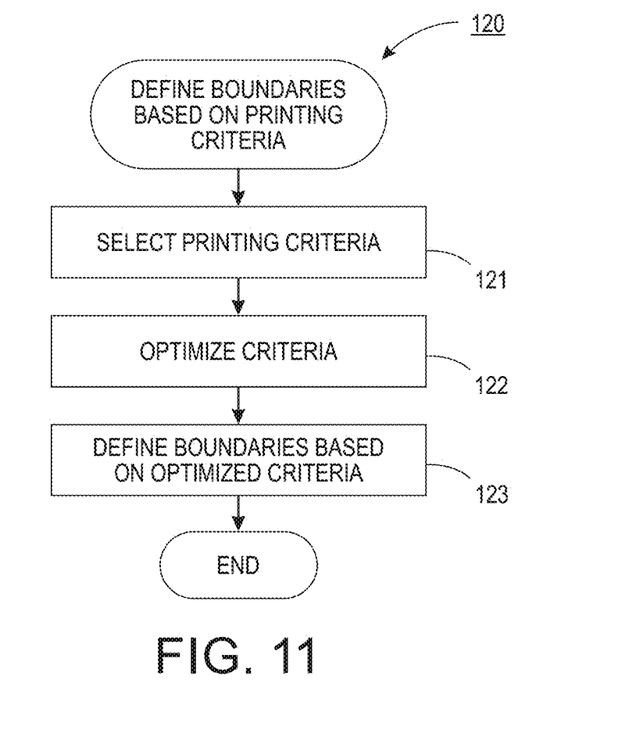
FIG. 11 is a flow diagram showing a routine for defining polygon boundaries based on printing criteria for use in the routine of FIG. 9 in accordance with one embodiment.

FIG. 11 is a flow diagram showing a routine 120 for defining polygon boundaries based on printing criteria 20 for use in the routine 100 of FIG. 9 in accordance with one embodiment. One or more printing criteria 20 are selected (step 121). As mentioned above with reference to FIG. 1, printing criteria 20 can include a number of stops and starts of movements of the extruding head during the printing; a number of the directions in which the extruding head moves during the printing; a time required for the printing; and smallest of the rates of change of the material composition during the printing, though other criteria are possible. A search routine is performed over a space of possible combinations of criteria to find an optimal combination of criteria (step 122). Such optimization can include minimizing the number of stops and starts of the printing head, minimizing the total number of directions used during the printing, minimizing the total printing time such as by minimizing the amount of non-printing travel that the extruding head makes), or minimizing the amount of material composition change required during the travel even if the change is achievable. The boundaries are defined based on the optimized criteria (step 123), ending the routine 120.

Figure 12:
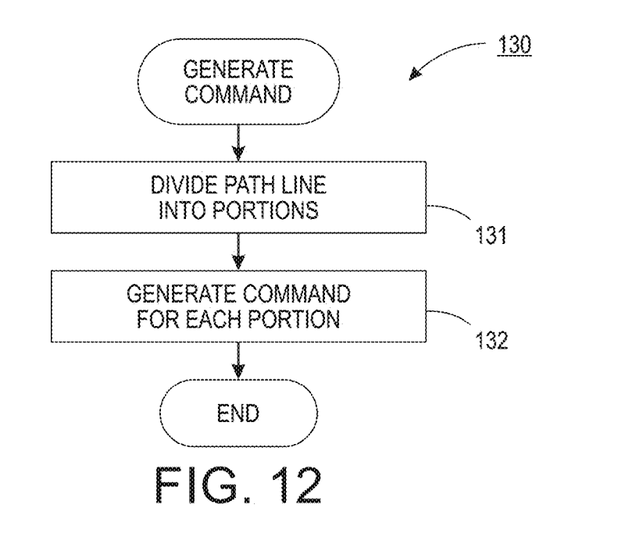
FIG. 12 is a flow diagram showing a routine for generating printer head material extrusion commands for use in the method of FIG. 7 in accordance with one embodiment.

The path lines generated for the extruding head to follow are used to generate commands. FIG. 12 is a flow diagram showing a routine 130 for generating printer head material extrusion commands for use in the method 80 of FIG. 7 in accordance with one embodiment. The lines of the generated path 22 are divided into a plurality of portions. A point in the layer can be a portion, though other portions are possible. A command is generated for each portion based on the material composition that needs to be extruded at that portion (step 132), ending the routine 130.

While the invention has been particularly shown and described as referenced to the embodiments thereof, those skilled in the art will understand that the foregoing and other changes in form and detail may be made therein without departing from the spirit and scope of the invention.

What is claimed is:

1. A system for printing path planning for functionally graded material with the aid of a digital computer, comprising:
   at least one processor configured to execute code, comprising:
      a retrieval module configured to retrieve one or more characteristics of a 3D printer, the printer comprising two or more reservoirs, each of the reservoirs shaped to store a printing material, the printer further comprising a mixing chamber for mixing the materials supplied from two or more of the reservoirs upon receiving material extrusion commands, and at least one printer head for extruding the mixed materials as a material mix;
      a representation module configured to obtain a representation of a layer of a functionally graded material object, the layer having a polygonal shape and comprising a plurality of points associated with a composition of the material mix, to be printed by the printer, wherein printing by the printer comprises extruding at every point the material mix of the composition associated with that point;
      a rate of change module configured to, for each of the points, compute rates of change in the material composition between the composition associated with that point and the compositions associated with one or more other of the points located in one or more directions from that point, and to compare the determined rates of change to a threshold;
      a determination module configured to determine for each of the points whether the printer head can move while printing the layer to one or more of the other points along one or more of the directions based on the characteristics, the rates of the change between that point and the other points, and the material composition at that point and the other point, wherein the printer head is determined to be able to move between that point and one of the other points if the rate of change associated with that point and the other point is below the threshold;
      a boundary module configured to define boundaries of a plurality of polygons comprised within the polygonal shape that can be printed by the printer head moving in one or more of the directions based on the determinations;
      a path module configured to generate a path for the head to follow to print all of the polygons based on the boundaries; and
      a command module configured to generate the material extrusion commands based on the generated path,
   wherein the printer prints all of the polygons based on the generated path and the material extrusion commands.

2. A system according to claim 1, wherein the representation comprises a multidimensional array.

3. A system according to claim 1, wherein the path comprises one of a zig-zag pattern and a direction-parallel pattern.

4. A system according to claim 1, further comprising:
a portion module configured to divide the path into a plurality of portions,
wherein one of the commands is generated for each of the portions.

5. A system according to claim 1, further comprising:
a direction module configured to determine a direction within the polygonal shape in which polygons with a greatest area can be defined, wherein the boundaries are defined in the determined direction before the boundaries of remaining ones of the polygons.

6. A system according to claim 1, further comprising:
a selection module configured to select one or more criteria for the printing;
an optimization module configured to optimize the selected criteria,
wherein the boundaries are defined based on the defined criteria.

7. A system according to claim 6, further comprising at least one of:
a minimization module configured to minimize a number of stops and starts of movements of the printer head during the printing;
a number module configured to minimize a number of the directions in which the printer head moves during the printing;
a time module configured to minimize a time required for the printing; and
a rate of change module configured to select smallest of the rates of change of the material composition during the printing.

8. A system according to claim 1, further comprising:
an array module configured to create an array comprising a plurality of values, each of the values indicating whether the printer head can move from one of the points to another one of the points,
wherein the boundaries are defined based on the array.

9. A system according to claim 1, wherein the characteristics comprise one or more rates at which the composition of the mixed materials in the mixing chamber can change.

10. A method for printing path planning for functionally graded material with the aid of a digital computer, comprising steps of:
retrieving one or more characteristics of a 3D printer, the printer comprising two or more reservoirs, each of the reservoirs shaped to store a printing material, the printer further comprising a mixing chamber for mixing the materials supplied from two or more of the reservoirs upon receiving material extrusion commands, and at least one printer head for extruding the mixed materials as a material mix;
obtaining a representation of a layer of a functionally graded material object, the layer having a polygonal shape and comprising a plurality of points associated with a composition of the material mix, to be printed by the printer, wherein printing by the printer comprises extruding at every point the material mix of the composition associated with that point;
for each of the points, computing rates of change in the material composition between the composition associated with that point and the compositions associated with one or more other of the points located in one or more directions from that point, and to compare the determined rates of change to a threshold;
determining for each of the points whether the printer head can move while printing the layer to one or more of the other points along one or more of the directions based on the characteristics, the rates of the change between that point and the other points, and the material composition at that point and the other point, wherein the printer head is determined to be able to move between that point and one of the other points if the rate of change associated with that point and the other point is below the threshold;
defining boundaries of a plurality of polygons comprised within the polygonal shape that can be printed by the printer head moving in one or more of the directions based on the determinations;
generating a path for the head to follow to print all of the polygons based on the boundaries; and
generating the material extrusion commands based on the generated path,
wherein the steps are performed by a suitably-programmed computer and wherein the printer prints all of the polygons based on the generated path and the material extrusion commands.

11. A method according to claim 10, wherein the representation comprises a multidimensional array.

12. A method according to claim 10, wherein the path comprises one of a zig-zag pattern and a direction-parallel pattern.

13. A method according to claim 10, further comprising:
dividing the path into a plurality of portions,
wherein one of the commands is generated for each of the portions.

14. A method according to claim 10, further comprising:
determining a direction within the polygonal shape in which polygons with a greatest area can be defined, wherein the boundaries are defined in the determined direction before the boundaries of remaining ones of the polygons.

15. A method according to claim 10, further comprising:
selecting one or more criteria for the printing;
optimizing the selected criteria,
wherein the boundaries are defined based on the defined criteria.

16. A method according to claim 15, further comprising at least one of:
minimizing a number of stops and starts of movements of the printer head during the printing;
minimizing a number of the directions in which the printer head moves during the printing;
minimizing a time required for the printing; and
selecting smallest of the rates of change of the material composition during the printing.

17. A method according to claim 10, further comprising:
creating an array comprising a plurality of values, each of the values indicating whether the printer head can move from one of the points to another one of the points,
wherein the boundaries are defined based on the array.

18. A method according to claim 10, wherein the characteristics comprise one or more rates at which the composition of the mixed materials in the mixing chamber can change.

19. A system for array-based printing path planning for functionally graded material with the aid of a digital computer, comprising:
at least one processor configured to execute code, comprising:
a retrieval module configured to retrieve one or more characteristics of a 3D printer, the printer comprising two or more reservoirs, each of the reservoirs shaped to store a printing material, the printer further comprising a mixing chamber for mixing the materials supplied from two or more of the reservoirs upon receiving material extrusion commands, and at least one printer head for extruding the mixed materials as a material mix;

a representation module configured to obtain a representation of a layer of a functionally graded material object, the layer having a polygonal shape and comprising a plurality of points associated with a composition of the material mix, to be printed by the printer, wherein printing by the printer comprises extruding at every point the material mix of the composition associated with that point;

a rate of change module configured to, for each of the points, compute rates of change in the material composition between the composition associated with that point and the compositions associated with one or more other of the points located in one or more directions from that point;

a determination module configured to determine for each of the points whether the printer head can move while printing the layer to one or more of the other points along one or more of the directions based on the characteristics, the rates of the change between that point and the other points, and the material composition at that point and the other point;

an array module configured to create an array comprising a plurality of values, each of the values indicating whether the printer head can move from one of the points to another one of the points;

a boundary module configured to define boundaries of a plurality of polygons comprised within the polygonal shape that can be printed by the printer head moving in one or more of the directions based on the determinations indicated by the values in the array;

a path module configured to generate a path for the head to follow to print all of the polygons based on the boundaries; and a command module configured to generate the material extrusion commands based on the generated path, wherein the printer prints all of the polygons based on the generated path and the material extrusion commands.

* * * * *